2,785,933
Patented Mar. 19, 1957

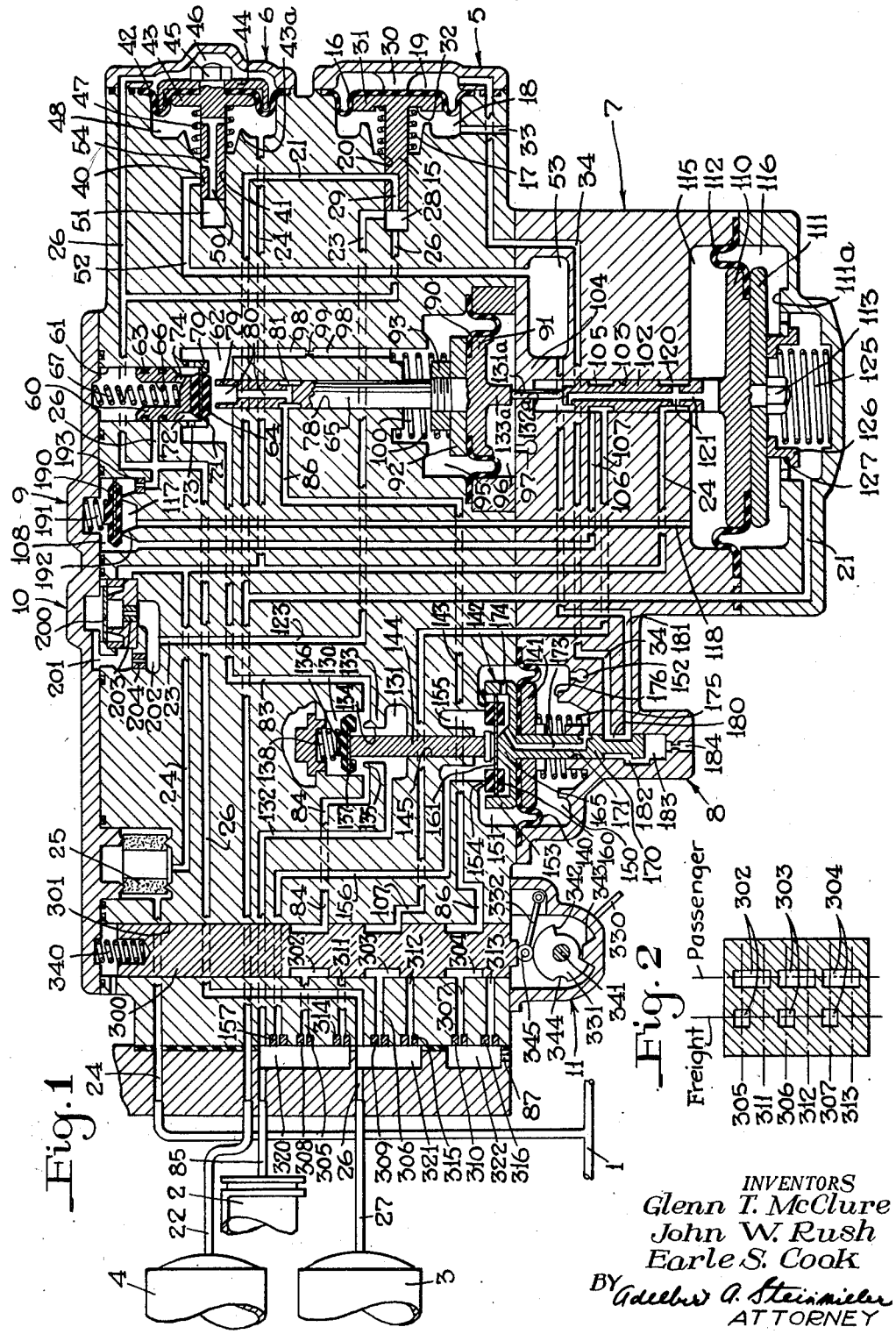

2,785,933

FLUID PRESSURE BRAKE APPARATUS

Glenn T. McClure, McKeesport, John W. Rush, Wilkinsburg, and Earle S. Cook, Forest Hills, Pa., assignors to Westinghouse Air Brake Company, Wilmerding, Pa., a corporation of Pennsylvania Application October 21, 1953, Serial No. 387,382

5 Claims. (Cl. 303—60)

This invention relates to fluid pressure brake apparatus and more particularly to the railway type as described and disclosed in the copending application of Earle S. Cook, Serial No. 379,543, filed September 11, 1953 (Case 5684), for use of European railway cars and which controls the degree of brake application according to variations in pressure of fluid in the brake pipe relative to pressure of fluid in a control reservoir associated with the respective equipment on any particular car.

The principal object of the invention is the provision of a simplified brake apparatus of the above type.

Another object of the invention is the provision of an improved brake controlling valve device comprised in the above type brake apparatus.

Still another object of this invention is the provision of an improved and simplified charging control valve device comprised in the above type fluid pressure brake apparatus.

Other objects and advantages of the invention will be apparent from the more detailed description of such invention.

In the accompanying drawing; Fig. 1 is a schematic view of fluid pressure brake apparatus embodying the invention; and, Fig. 2 is a diagrammatic representation disclosing the certain fluid pressure connections established within the fluid pressure brake apparatus in different positions of a serviec selective valve device comprised in such apparatus.

Description

As shown in drawing, the brake equipment embodying the invention comprises the usual brake pipe 1, pressure of fluid in which is varied by a brake valve device (not shown) on the locomotive to control the degree of brake application on the various cars in the train; a respective brake cylinder device 2 associated with a particular car employing the fluid pressure brake apparatus for effecting such brake application; an auxiliary reservoir 3 for storing fluid under pressure from the brake pipe 1 for supply to the brake cylinder device 2; a control reservoir 4 to store fluid under pressure from the brake pipe 1 to act as a datum presure relative to which variations in pressure of fluid in the brake pipe 1 are utilized to control the degree of brake application.

The brake apparatus further comprises: a charging control valve device 5 which controls connection of the auxiliary reservoir 3 and control reservoir 4 with the brake pipe 1 to thereby control the charging of these reservoirs with fluid under pressure from said brake pipe; a quick service valve device 6 which responds during an initiation of a brake application upon a slight reduction in pressure of fluid in the brake pipe 1 to effect local reduction in brake pipe pressure on the particular car employing the brake apparatus; a brake controlling valve device 7 which will respond during inititation of a brake application to the reduction in brake pipe pressure effected by operation of the quick service valve device 6 to effect and to establish connection between the brake cylinder 2 and the auxiliary reservoir 3 for applying the brakes and subsequently to the degree of pressure of the fluid in the brake pipe 1 relative to pressure of fluid in the control reservoir 4 to control degree of pressure in said brake cylinder 2; a brake cylinder inshot control valve device 8 which functions to allow for relatively rapid supply of fluid under pressure to the brake cylinder device 2 during initiation of a brake application to take up the slack in the brake rigging and advance the shoe into engagement with the wheel at a relatively rapid rate, and, thereafter, to establish a restricted supply communication to the brake cylinder device to allow for subsequent increase in the degree of application of the brakes at a controlled rate; an auxiliary reservoir recharge check valve device 9; an auxiliary and control reservoir initial-charging and overcharge-dissipating check valve device 10 to provide for admittance of charging fluid from the brake pipe 1 to the supply reservoir 3 and control reservoir 4 at a controlled rate during their initial charging, while automatically establishing less restricted overcharge-dissipating communication between these two reservoirs and the brake pipe should these reservoirs become over charged; a service selector valve device 11 positionable selectively to establish respective communications whereby the rate of supply and release of fluid under pressure to and from the brake cylinder device 2 as well as the rate of supply of fluid under pressure to the auxiliary reservoir 3 may be determined according to the type and service of the train on which the brake apparatus is being employed.

According to a feature of the invention, the simplified charging control valve device 5 comprises a cylindrical slide valve 15 for controlling communication between the brake pipe 1 and the auxiliary and control reservoirs 3 and 4, a single diaphragm 16 is operatively connected to the slide valve 15 and subject opposingly to force of a compression spring 17 disposed in a non-pressure chamber 18 on one side and to pressure of fluid in a pressure chamber 19 on its opposite side.

The slide valve 15 is preferably in the form of a cylindrical stem slidably mounted in a bore 20 into radial intersection with the walls of which there is a control reservoir passageway 21, connected to the control reservoir 4 by way of a pipe 22, and a brake pipe passageway 23, connected to the brake pipe 1 by way of the device 10, passageway 24, and an air strainer 25. An auxiliary reservoir passageway 26, constantly connected to the auxiliary reservoir 3 by way of pipe 27, opens centrally into the end wall of the bore 20 for constant communication with a charging chamber 28 defined within the bore 20 between the end of the valve 15 and the end of said bore. A control reservoir supply passage 29 is provided in the valve 15 which is in constant open communication at one end with the chamber 28 and at its opposite end opens radially outward into the outer cylindrical surface of the valve 15 for registry with the reservoir control passageway 21 in the position in which the valve 15 is shown in the drawing, and in which position the said valve uncovers the brake pipe passageway 23 to said chamber 28; which position is defined by engagement of the diaphragm 16 with a stop element 30 formed in the casing and projecting from the outer wall of the chamber 19. Operative connection between the diaphragm 16 and the valve 15 is established through the medium of a follower member 31 which may be integrally attached to the respective end of said valve, and which is provided with a recess 32 in encirclement of the respective end of said valve 15 to accommodate and locate the respective end of the compression spring 17 which acts to urge said follower 31 into engagement with said diaphragm.

The non-pressure chamber 18 in the charging control valve device 5 is constantly open to the atmosphere by way of a passageway 33, while the pressure chamber 19 is adapted to be supplied with fluid under pressure by way of a passageway 34 and the brake cylinder inshot valve device 8, in manner and purpose as will be described in detail hereinafter.

The quick service valve device 6 comprises a cylindrical slide valve 40 which is slidably mounted in a suitable bore 41 and operatively connected to a diaphragm 42 through the medium of follower members 43 and 44 which are clamped to the diaphragm through the medium of a nut and stud bolt arrangement 45. The diaphragm 42 is subject opposingly to pressure of fluid in an auxiliary reservoir pressure chamber 46 at one side and to pressure of fluid and force of a light bias spring 47 in a brake pipe pressure chamber 48 at the opposite side. The slide valve 40 is provided with a central passageway 50 which extends from the brake pipe pressure chamber 48 at its one end to the clearance volume 51 within the bore 41, between the end of the bore 41 and the end of said valve, to allow for equalization of pressures at opposite ends of said valve and avoid trapping of any volume of fluid in the chamber 51 which would interfere with movement of the valve in that direction. Quick service volume passageway 52, in constant communication with the quick service volume 53, opens into radial intersection with the wall of the bore 41, and the passageway 50 in the valve 40 is provided with a radial port 54 for registry with the quick service passageway 52 during operation of the quick service valve device 6 and consequent moving of the valve 40 to a registering position as will be described in detail hereinafter.

Pressure chamber 48 in the quick service valve device 6 is in constant open communication with the brake pipe 1 by way of the passageway 24 and the air strainer 25 interposed therein; and pressure chamber 46 is in constant open communication with the auxiliary reservoir 3 by way of the passageway 26 and pipe 27.

The brake controlling valve device 7 comprises a brake cylinder supply valve 60 slidably disposed in a bore 61 and arranged for cooperation with a branch of auxiliary reservoir passageway 26 opening into the wall of said bore to control admission of fluid under pressure from the auxiliary reservoir 3 to brake cylinder device 2 by way of said passageway 26 and a chamber 62 at one side of said supply valve. The brake cylinder supply valve 60 is substantially cylindrical in shape for slidable cooperation with the wall of the bore 61 and is provided with the usual sealing ring 63 to prevent leakage of fluid under pressure past the valve. A release valve 64 is provided to control communication between the brake cylinder pressure chamber 62 and the atmosphere by way of release valve seat element 65. Release valve 64 is substantially disc-shaped and comprises a resilient portion bonded to a thin metal plate, the outer peripheral surface of which plate is slidably guided within the walls of the bore 61. The brake cylinder supply valve 60 is provided with a lowermost portion, as viewed in the drawing, for accommodation of the release valve 64. A central cavity 66 is formed in the supply valve 60 at its opposite end to accommodate disposition of one end of a compression spring 67, while the end wall of said recess 66 acts as a seat for the respective end of the spring. The opposite end of the spring 67 engages a portion of the casing and the spring acts to urge the supply valve 60 into abutting engagement with the release valve 64 and to urge the latter in the direction of the chamber 62. The portion of the bore 61 in which the release valve 64 is disposed takes the form of a cylindrical cage 70 which extends into the chamber 62 and is provided with a radially inward extending annular stop element 71 on its outermost projecting end for cooperation with the plate portion of the release valve 64 to define its limit position with respect to valve 60, in which position it is shown in the drawing and toward which it is urged by action of the spring 67 on supply valve 60. The portion of the supply valve 60 in proximity of the release valve 64 is of lesser diameter than the portion of said valve 60 in slidable engagement with the bore 61, to provide an annular clearance space 72 between the bore 61 and said portion. The annular clearance space 72 is in constantly open communication with the brake cylinder pressure chamber 62 by way of radial ports 73 in the element 70, and in constantly open communication with the opposite side of the supply valve 60 by way of a port 74 and the spring recess 69 to allow for equalization of pressures across the supply valve so that only the resistance of the spring 67 and some slight friction between the valve 60 and the wall of bore 61 need be overcome to move the release valve 64 and supply valve 60 in the direction away from the chamber 62. In the position of the release valve 64 in which it is shown in the drawing, the supply valve 60 will be in its lap position in which it is also shown in the drawing closing off the supply reservoir passageway 26 from the interior of the bore 61.

Release valve stem 65 is in the form of a cylindrical rod slidably disposed in a bore 78 in coaxial alignment with the release valve 64. The element 65 projects into the chamber 62 in proximity of the release valve 64 and at that end is provided with an annular seat 79 encircling one end of a central passageway 80 extending from the chamber 62 at the respective end of the element 65 to open communication with an annular groove 81 formed in the periphery of the element 65 a certain distance away from its projecting end. The brake cylinder pressure chamber 62 is in constant open communication with the brake cylinder 2 by way of a passageway 83, the brake cylinder inshot valve device 8, a passageway 84, the service selector valve device 11, and a pipe 85. A brake cylinder release passageway 86, in constant open communication with the atmosphere by way of a port 87 and the selector valve device 11, is arranged to open to the wall of the bore 78 for registry with the groove 81 when the release valve seat element 65 is disposed in the position in which it is shown in the drawing to allow for communication between the brake cylinder pressure chamber 62 and said release passageway 86 via the passageway 80 in said element 65.

The opposite end of the release valve seat element 65 is operably connected to a brake cylinder pressure responsive diaphragm 90 through the medium of a diaphragm follower element 91 formed integrally with said element 65, and a follower element 92 in abutment with the element 91 and held in clamping engagement with the diaphragm 90 by action of a nut 93 in screw-threaded attachment with a portion of the element 65. Diaphragm 90 assemblage is subject to pressure within a brake cylinder pressure chamber 95 at its side from which the respective end of the element 65 projects and is exposed on its opposite side to atmospheric pressure in a non-pressure chamber 96, which latter chamber is constantly open to the atmosphere by way of a port 97. A passageway 98 communicates the brake cylinder pressure chamber 95 with the brake cylinder pressure chamber 62, and a stabilizing choke 99 to serve the usual purpose is provided in the passageway 98 between the two chambers 62 and 95. A compression spring 100 is disposed in the brake cylinder pressure chamber 95 and interposed between the casing and the diaphragm follower 92 in encirclement of the release valve seat element 65 to urge the diaphragm 90 assemblage in the direction of the non-pressure chamber 96 toward the repose position in which it is shown in the drawing.

In addition, the brake controlling valve device 7 comprises a slide valve 102 for controlling recharge of the auxiliary reservoir 3 by fluid under pressure from the brake pipe 1. Slide valve 102 is in the form of a cylindrical stem slidably disposed in a bore 103 which is in coaxial alignment with the bore 78 in which the release valve seat element 65 is disposed. The closed end of the bore 103 is formed in a partition 104 which divides the interior of the bore at one side from the non-pressure chamber 96 on the opposite side. As shown in the drawing, adjacent its upper end, the slide valve 102 is provided with an annular recess 105 adapted for registry with the ports of a pair of passageways 106 and 107 connected to the discharge chamber 108 of the auxiliary reservoir recharge check valve device 9 and with the auxiliary reservoir 3, respectively, for reasons which hereinafter will become apparent. Slide valve 102 is operably attached through the medium of follower members 110 and 111 to a diaphragm 112 clamped between such follower members by action of a nut 113 in screw-threaded attachment with an integral portion of the follower member 110. The assemblage including the diaphragm 112 is subject at one side to pressure of fluid in a brake pipe pressure chamber 115 and to pressure of fluid in a control reservoir pressure chmber 116 on the opposite side. The brake pipe pressure chamber 115 is in constantly open communication with an inlet 117 to the auxiliary reservoir recharge check valve device 9 by way of an auxiliary reservoir recharge passageway 118, while the control reservoir pressure chamber 116 is in constantly open communication with the control reservoir 4 by way of a respective branch of the passageway 21, and the pipe 22. An annular recess 120 formed in the outer periphery of the slide valve 102 is adapted for registry with the port end of a respective branch of the brake pipe passageway 24 to establish communication between said passageway and the brake pipe pressure chamber 115 by way of ports and passageway 121 in said slide valve constantly open to said chamber 115; continuation of the passageway 121, as shown in the drawing, opening at its uppermost end to the clearance volume within the bore 103 between the partition 104 and the uppermost end of said valve 102 to establish a balance of pressures at opposite ends of the stem. The brake controlling valve device 7 is further provided with a compression spring 125 disposed in the control reservoir pressure chamber 116 and arranged in cooperation with the casing and a stop element 126 to urge the latter to a seated position in engagement with a fixed casing stop element 127, for reasons which will hereinafter become apparent. The uppermost end of the slide valve 102 is connected for co-operative association with the diaphragm follower member 91 through the medium of a pin 131a slidably fit in an accommodating opening 132a extending through the partition 104 and interposed between the uppermost end of the slide valve 102 and a centrally projecting portion 133a integrally attached to said diaphragm follower member 91. The opposite ends of the pin 131a are rounded for abutting contact with the accommodating surfaces of the slide valve 102 and projecting portion 133a of follower member 91, respectively.

The brake cylinder inshot valve device 8 comprises a chamber 130 in constant communication with the passages 83 and 84 and a chamber 131 in constant communication with the brake cylinder device 2 by way of passage 132 and the pipe 85; the chamber 130 being separated from the chamber 131 by a partition 133 in which there is an opening 134 extending between the two chambers. The opening 134 in the partition 133 at the chamber 130 end is encircled by an annular valve seat 135 provided to accommodate a valve 136 disposed in said chamber 130 for cooperation with said seat to control communication between the chambers 130, 131 via said opening.

The valve 136 may take the form in which it is shown in the drawing as a poppet-type valve composed of resilient material suitably bonded to a metal element 137 slidably guided at its outer periphery by engagement with the side wall of the chamber 130. A light compression spring 138 is disposed in chamber 130 and arranged to bias the valve 136 toward its seat 135.

For actuating the valve 136 against opposition of spring 138 a diaphragm 140 is provided which is operatively connected to said valve through the medium of diaphragm follower members 141 and 142, a diaphragm-operation-modifying valve 143 and a stem 144. Stem 144 is slidably guided adjacent its one end in a stem accommodating opening 145 formed in the casing, said stem extending through the chamber 131 and opening 134 into the chamber 130 for abutment at its one end with the valve 136.

The diaphragm follower members 141 and 142 cooperate one with the other into clamping engagement with the diaphragm 140 for movement with deflection thereof. Diaphragm follower members 141 and 142 are disposed in a non-pressure chamber 150 and a brake cylinder pressure chamber 151, respectively, at opposite sides of the diaphragm 140; the non-pressure chamber 150 being constantly open to the atmosphere by way of a port 152. The diaphragm follower member 142 comprises a sleeve-like portion 153 projecting into the brake cylinder pressure chamber 151 with its open end disposed in coaxial alignment with an annular valve seat 154 of lesser diameter than said sleeve-like portion. The seat 154 is arranged to accommodate the diaphragm-operation-modifying valve 143 slidably accommodated within the sleeve-like portion 153 of follower member 142, and such seat encircles the one end of a cylindrical chamber 155 constantly open to the brake cylinder device 2 by way of a passage 156, a stabilizing choke 157, a header chamber 320, passage 132 and the pipe 85.

The diaphragm-operation-modifying valve 143 comprises an annular valve portion 160 of resilient material suitably bonded to a metal disk element 161 slidably accommodated at its outer periphery by the inner wall of the sleeve-like portion 153 of follower member 142. The valve 143 is retained within said sleeve-like portion 153 by action of the bias spring 138 acting on said valve through the medium of the valve 136 and stem 144. The respective end of the stem 144 is suitably formed for abutting engagement with the upper surface of disk portion 161 of the valve 143, and a centrally projecting portion 165 is provided the diaphragm follower member 142 for abutment with the lower surface of disk portion 161 of the valve 143 to act as the medium through which said valve may be advanced in the direction of its seat 154 and caused to assume the closed position in which it is shown in the drawing.

Brake cylinder inshot valve device 8 further comprises a slide valve 170 in the form of a cylindrical stem slidably fit in an accommodating bore 171 in coaxial alignment with the previously mentioned opening 145. The slide valve 170 is operably connected to the diaphragm assemblage by way of an extension passing through a central opening in the diaphragm follower member 141 in integral attachment with the diaphragm follower member 142. The slide valve 170 is provided with a central opening passageway 173, one end of which is constantly open to the pressure chamber 151 through the medium of the interior of the sleeve-like element 153 and a port 174 therein, while the opposite end of said passageway 173 opens radialwise outwardly through the outer peripheral surface of the valve 170 for exposure to chamber 150 when the valve 170 is in the position in which it is shown in the drawing and for registry with passage 34 when said valve is in a lowermost position to be described in detail hereinafter.

An annular groove 180 is provided the valve 170 adjacent to its lowermost end, as viewed in the drawing, for registry with the open ends of the passageways 34 and 181 and an axially-extending groove 182 formed in the wall of the opening 171 which opens to the atmosphere via a chamber 183 and a restricted port 184 when said valve is in the position in which it is shown in the drawing.

The auxiliary reservoir recharge check valve device 9 comprises a check valve 190 of resilient material reciprocable within the outlet chamber 108 and arranged to be urged by a compression spring 191 in the direction of an annular seat 192 encircling the inlet opening 117 of said device 9. An auxiliary reservoir maintenance choke 193 is associated with device 9; its outlet end being connected to the outlet chamber 108 and its inlet end connected to a branch of passage 26.

The auxiliary and control reservoir initial-charging and overcharge-dissipating control device 10 comprises a check valve 200 subject opposingly to pressure of fluid in an inlet chamber 201 and an outlet chamber 202 to control communication between the two chambers by way of an overcharge-dissipating choke 203; the inlet chamber 201 being constantly connected to the brake cylinder supply passageway 24 and the outlet chamber 202 being constantly connected to the passageway 23. An initial-charge-limiting choke 204 constantly opens the inlet chamber 201 to the outlet chamber 202 in by-passing relationship with choke 203 and check valve 200. The check valve 200 is arranged to prevent flow of fluid under pressure from the inlet chamber 201 to the outlet chamber 202 by way of the choke 203, while a preponderance in pressure of fluid in the outlet chamber 202 over that in the inlet chamber 201 will unseat the check valve 200 to allow for flow of fluid under pressure from the outlet chamber 202 to the inlet chamber 201 by way of the choke 203 in addition to choke 204.

The service selector valve device 11 comprises a slide valve 300 in the form of a cylindrical stem which is slidably guided in sealing cooperation with the wall of a bore 301 formed in the casing. The valve 300 is provided with three spaced-apart annular grooves 302, 303 and 304 which are in constant registry with respective open ends of the passageways 84, 107 and 86 which open into the wall of the bore 301. In addition the grooves 302, 303 and 304, are in constant registry with the respective ends of passageways 305, 306 and 307, the opposite ends of which passageways are in constant communication with the brake cylinder device 2, the supply reservoir 3 and the atmosphere, respectively, by way of chokes 308, 309, 310, respectively. The valve 300 is adapted to be moved from its "Freight" position in which it is shown in the drawing to a "Passenger" position as indicated in Fig. 2 to establish registry of the grooves 302, 303 and 304 with additional passages 311, 312 and 313, to connect chokes 314, 315 and 316 in parallel with the chokes 308, 309, 310, respectively. The ends of the chokes 308 and 314 are constantly open to the pipe 85 and hence to the brake cylinder device 2 by way of the header chamber 320. The respective ends of the chokes 309 and 315 are in constant communication with the auxiliary reservoir 3 by way of a header chamber 321 and the passageway 26 and pipe 27. The chokes 310 and 316 are constantly open to the atmosphere by way of the port 87 and a header chamber 322. The valve 300 is adapted to be actuated to either its "Freight" or "Passenger" position through the medium of an operator's handle 330 operatively connected to said valve through the medium of a cam 331 and a follower member 332 interposed between said cam and one end of the valve 300. The other end of the valve 300 is engaged by a compression spring 340 which urges the valve into engagement with the respective end of the follower member 332 which in turn is urged into contact with the cam 331. From the "Freight" position in which it is shown in the drawing, the handle 330 may be rocked in a clockwise direction as viewed in the drawing above a shaft 341 to cause the cam to assume a position defined by engagement of a stop shoulder 342 formed in said cam with a corresponding shoulder 343 formed in the casing, to present a recess 344 formed in said cam to a roller end 345 of the follower member 332, thereby allowing the spring 340 to move the valve 300 in the direction of the cam 331 as the roller 345 drops into the groove 344. In such "Passenger" position of the handle 330 the grooves 302, 303 and 304, establish connection between the passages 84, 107 and 86, with the passages 305 and 311, 312 and 306, and 307 and 313, respectively, as indicated in diagrammatic representation shown in Fig. 2.

*Operation*

With the brake equipment void of fluid under pressure, all parts of the equipment will assume the positions in which they are shown in the drawing, except the manually adjustable selector valve device 11, which, for the time being, will be assumed to be in its "Freight" position, in which position it is shown in the drawing.

*Initial charging of the brake equipment*

To initially charge the brake equipment on a train, as well as in recharging the brake equipment to effect a release of the brakes after a brake application, it is customary to move the usual engineer's brake valve device (not shown) on the locomotive first to a release position for supplying fluid at a relatively high pressure directly from the usual main reservoir on the locomotive to the brake pipe at the locomotive, and then after the lapse of a period of time, as determined by the operator of the brake valve device according to different conditions, the brake valve device will be moved to "Running" position to reduce the pressure of further supply of fluid to the brake pipe to a normal value for continued charging of the brake pipe throughout the train to the normal pressure to be carried therein. The pressure in the brake pipe on the first, perhaps fifteen, cars of the train will therefore be initially increased to a degree in excess of the degree normally carried. The degree of such overcharge of the brake pipe being greatest on the car coupled to the locomotive and decreasing from car to car back from the locomotive; the above-mentioned time which the brake valve device is allowed to remain in "Release" position as well as the number of cars in the train and the equipment thereon, determine the number of cars on which the brake pipe becomes overcharged and of what duration.

Upon supply of fluid under pressure to the brake pipe 1 as above, to charge the auxiliary and control reservoirs 3 and 4 on each car employing the subject brake equipment, on any particular car, fluid under pressure from the brake pipe 1 will flow by way of the respective brake pipe passage 24 in the respective brake equipment to the brake pipe pressure chamber 48 in the quick service valve device 6 and also at a restricted rate from the passage 24 to the chamber 28 in the charging control valve device 5 by way of chambers 201, 202 and the initial-charge-limiting choke 204 in the device 10 and the passage 23.

From the chamber 28 in the charging control valve device 5, such fluid under pressure will flow to the auxiliary reservoir 3 by way of a respective branch of passage 26 and the pipe 27 without restriction, as well as to the control reservoir 4 and control reservoir pressure chamber 116 in the graduating control device 7 by way of passage 29 in the valve 15 of the device 5, and respective branches of passage 21, thereby effecting the pressurization of such chambers. Choke 204 acts to so limit admission of initial charge into the auxiliary and control reservoirs 3 and 4 in the equipment in cars at the front end of the train as to reduce the tendency for such reservoirs to become overcharged during the period that the brake pipe is overcharged, while at the same time tending to assure a substantially uniform buildup in brake pipe pressure throughout the length of the train as the respective successive equipments on the various cars of the train become substantially simultaneously initially charged at the same rate.

While the initial-charge-limiting choke 204 in each of the brake equipments reduces the tendency for the respective auxiliary and control reservoirs 3 and 4 to become overcharged during initial charging of such equipments, it is possible, if the brake pipe 1 on any particular car remains overcharged after the control and auxiliary reservoirs 4 and 3 on that particular car have been pressurized to the normal degree, that same will become overcharged with continued flow of fluid under pressure thereto from the overcharged brake pipe by way of the initial-charge-limiting choke 204. However, subsequent reduction in the pressure in the brake pipe to its normal value on that particular car or cars will allow the overcharge pressure in the control and auxiliary reservoirs 4 and 3 to disspitate at a relatively rapid rate by way of the chamber 28 in the charging control valve device 5 and both the initial-charge-limiting choke 204 as well as through the choke 203 by unseating the check valve 200 to the brake pipe 1 by way of the brake pipe passage 24 and air strainer 25. Thus, it will be seen that by virtue of the arrangement of the chokes 203 and 204 and of the check valve 200, initial charging of the control and auxiliary reservoirs 4 and 3 in any particular brake equipment is admitted at a controlled rate by way of the initial-charge-limiting choke 204 to reduce the tendency for said reservoirs to become overcharged during overcharge of the brake pipe, while dissipation of overcharge of such reservoirs, if such condition exists, is provided for at a sufficient rate by automatic combination of the capacities of both the choke 204 and the choke 203.

Substantially at the same time that the respective auxiliary reservoir 3 is being initially charged as above described, fluid under pressure admitted thereto via passage 26 will also flow simultaneously by way of a branch of passage 26 into the auxiliary reservoir pressure chamber 46 in the quick service valve device 6. It will be appreciated that since the auxiliary reservoir pressure chamber 46 in the quick service valve device 6 is being charged by the fluid under pressure from the brake pipe 1, the pressure of fluid in such auxiliary reservoir pressure chamber 46 will never exceed that in the brake pipe pressure chamber 48 on the opposite side of diaphragm 42 during initial charging, and therefore, the spring 47 in said quick service valve device 6 will maintain said device in its previously defined lap position in which it is shown in the drawing and in which the quick service volume passage 52 is maintained disconnected from the brake pipe pressure chamber 48 and thereby from the brake pipe.

At the same time, in each of the brake equipments thus initially charged, fluid under pressure supplied to the brake pipe 1 will flow without restriction by way of passage 24 to the brake pipe pressure chamber 115 in the graduating control device 7 by way of the groove 120 and passage and ports 121 in the valve 102 of said device 7.

Since, during initial charging, the brake cylinder pressure chamber 95 in device 7 remains void of fluid above atmospheric pressure (in that said chamber 95 is connected to the atmosphere by way of passage 98, stabilizing choke 99, chamber 62, passage 80 and groove 81, in valve 65, passage 86, groove 304 in valve 300 of the service selector valve device 11, passage 307, choke 310, header chamber 322, and port 87) and since the chamber 96 at the under side of diaphragm 90 is constantly open to the atmosphere; the balance of forces on the diaphragm stack in the graduating control device 7 is determined by the opposing pressures of fluid established in the brake pipe pressure and control reservoir pressure chambers 115 and 116.

Also, it will be appreciated, that since the respective control reservoir pressure chamber 116 in the graduating control device 7 is being pressurized by fluid under pressure supplied from the brake pipe 1 on the particular car by way of the choke 204, such pressure in chamber 116 will never exceed, during initial charging of the auxiliary and control reservoirs 3 and 4, that in the brake pipe pressure chamber 115 in the respective graduating control device 7, so that at such time, the diaphragm stack will never tend to move or never be moved from its release position, in which it is shown in the drawing defined by contact with stop element 126, in the direction of said brake pipe pressure chamber 115.

However, due to the restriction imposed by the initial-charge-limiting choke 204 to initial charging of the auxiliary and control reservoirs 3 and 4, as well as to the chambers connected thereto, at any given time on any particular car, during such initial charging, brake pipe fluid transmitted without restriction to the brake pipe pressure chamber 115 in the respective graduating control device 7 will tend to exceed that in the control reservoir pressure chamber 116 in said device. The diaphragm stack in said device will respond to a preponderance in pressure in the brake pipe pressure chamber 115, as experienced therein by virtue of flow of brake pipe fluid from the respective branch of the passage 24 by way of the groove 120 and passage and ports 121 in valve 102, over the pressure in the control reservoir pressure chamber 116 above a certain degree, as determined by the value of the spring 125, to move the stack in the direction of said control reservoir pressure chamber 116 to cause movement of the valve 102 relative to the open end of the passage 24 to so restrict such open end that the degree of preponderance in pressure in chamber 115 over that in the control reservoir pressure chamber 116 and hence in the auxiliary reservoir 3 connected thereto via the device 5 will be limited to a degree insufficient to unseat the spring loaded check valve 190 during initial charging of the equipment.

As a result of such automatic action of the diaphragm stack in the graduating control device 7 on any particular car to limit the degree of pressurization of the brake pipe pressure chamber 115 to a value less than that required to unseat the check valve 190 as above described, it will be appreciated that the respective control and auxiliary reservoirs 4 and 3 are initially charged exclusively by way of the initial-charge-limiting choke 204 as previously described. It will also be appreciated, that, in any particular brake equipment or equipments on cars such as on the rear of the train, where, during initial charging, the brake pipe pressure may be increasing at a relatively low rate due to the pressure gradient existing in the brake pipe extending through the train, such relatively slow increase in brake pipe pressure may allow for substantial equalization of pressures across the initial-charge-limiting choke 204, so that the pressure of fluid in the brake pipe pressure chamber 15 in the graduating control device 7 and the pressure of fluid in the control reservoir pressure chamber 16 in said device 7 may be substantially equal. In which case, said diaphragm stack in said device 7 will remain in the release position in which it is shown in the drawing, with the groove 120 in the valve 102 so disposed so as to offer relatively little restriction to flow of brake pipe fluid from the passage 24 into said brake pipe pressure chamber 115. However, under such conditions, it will be appreciated that since the control reservoir 4 and connected control reservoir pressure chamber 116 are in turn connected to the auxiliary reservoir 3 without restriction by way of the chamber 28 in the charging control valve device 5, the auxiliary reservoir pressure as experienced at the outlet side of the check valve 190 will substantially equal the pressure of brake pipe fluid at the input side of said check valve device as supplied thereto by way of the passage 118 from the brake pipe pressure chamber 115, and any charging of the auxiliary reservoir 3 by way of said check valve device 9 is prevented while the initial charging takes place as previously described exclusively by way of the respective initial-charge-limiting choke 204.

Since the brake cylinder 2 on each car of the train in the respective brake control equipment remains vented to the atmosphere (by way of pipe 85, passage 132, chambers 130, 131 in the inshot valve device 8, passage 83, chamber 62, passage 80 and groove 81 in valve 65 of the graduating control device 7, passage 86, groove 304 in valve 300 of the service selector valve device 11, passage 307, choke 310, header chamber 322 and port 87), and since the chamber 155 in inshot device 8 (connected to the brake cylinder 2 by way of the passage 156, choke 157, header chamber 320, passage 132 and pipe 85) is also vented to the atmosphere at this time, said inshot valve device 8 will remain in the position in which it is shown in the drawing during initial charging of the equipment, venting respective quick service volume chamber 53 and chamber 19 in the charging control valve device 5 to the atmosphere by way of passages 181 and 34, respectively, and, in the device 8, the groove 180 in valve 170, passage 182, chamber 183, and restricted port 184.

Since chamber 18 in the charging control valve device 5 is constantly open to the atmosphere, and since at this time the chamber 19 in said device 5 is also vented to the atmosphere as above described, during initial charging of the equipment the charging control valve device 5 will remain in the position in which it is shown in the drawing and in which its slide valve 15 is positoned to establish communication between its chamber 28 and the brake pipe, auxiliary reservoir, and control reservoir passages 23, 26 and 21, to allow for supply of fluid under pressure from brake pipe to the auxiliary and control reservoirs 3 and 4 as previously described. From the foregoing it will be apparent that subsequent to initial charging of the equipment on cars in the train in which pressure of fluid in the brake pipe has been established to a value normally carried and which value may vary throughout the length of the train according to the usual pressure gradient caused by leakage of fluid under pressure from the brake pipe, in the fluid pressure brake equipment on any particular car of the train, the respective control and auxiliary reservoirs 4 and 3 will become charged to the same value as that existent in the brake pipe on that particular car.

*Effecting application of brakes*

When it is desired to effect an application of brakes, a reduction in pressure in the brake pipe 1 will be initiated by the engineer's brake valve device on the locomotive in the well-known manner. In the brake equipment on any particular car, when the brake pipe pressure is reduced as just mentioned, the respective check valve 190 will prevent flow of fluid under pressure from the auxiliary reservoir 3 and the control reservoir 4 to the brake pipe by way of the passage 118, chamber 115 in graduating control device 7, ports and passage 121 and groove 120 in valve 102 to the brake pipe passage 24, although momentarily there will be a slight trickle back through the initial-charge-limiting choke 204 to passage 24 by way of the chamber 28 in the charging control device 5 and the passage 23 connected to the input side of said choke 204, which, however, is of no consequence during the operation under consideration.

As a result of the initial reduction in brake pipe pressure as effected by operation of the engineer's brake valve device on the locomotive, the pressure in the brake pipe 1 on the first car of the train will promptly reduce with that on the locomotive and when reduced, for example, four-tenths of a pound, such reduction as experienced in the brake pipe pressure chamber 48 in the quick service valve device 6 relative to the pressure of fluid in the auxiliary reservoir pressure chamber 46 on the opposite side of the diaphragm 42 will create a sufficient differential in pressure on opposite sides of said diaphragm to deflect the diaphragm against opposition of the spring 47 and move the slide valve 40 to a quick service position which opens said brake pipe pressure chamber 48 to the quick service volume passage 52, by way of port and passage 54 in said valve; such position being defined by contact between diaphragm follower 43 and the shoulder 43a in the casing.

Upon establishment of the connection between the brake pipe pressure chamber 48 in the quick service valve device 6 and the passage 52 as above mentioned, fluid under pressure will flow from the former by way of the latter to the respective quick service volume 53 and thence by way of passage 181 and groove 180 in valve 170 of the brake cylinder inshot valve device 8, and passage 34 to the pressure chamber 19 in the charging control valve device 5. As a consequence, brake pipe pressure as experienced in the brake pipe pressure chamber 48 in the quick service valve device 6 will promptly equalize into the quick service volume chamber 53 and the pressure chamber 19 in the charging control valve device 5. The pressure of fluid in the pressure chamber 19 in the cutoff valve device 5 acting on diaphragm 16 will cause sufficient force to act on the diaphragm 16 in opposition to spring 17 to move the diaphragm in the direction of said spring and to carry slide valve 15 to its lap position in which the passage 29 of said slide valve is cut off from the control reservoir passage 21 and the brake pipe passage 23 is closed off from the chamber 28 and thence from the supply reservoir passage 26. In this cutoff or lap position of the slide valve 15, it will be appreciated that the auxiliary reservoir 3 is cut off from the control reservoir 4 and both of these reservoirs are cut off from the brake pipe 1.

By virtue of the connection established between the brake pipe 1 and the quick service volume 53 during operation of the quick service valve device 6 to move its slide valve 40 to its quick service position, as above described, fluid under pressure from the brake pipe will flow by way of passage 24, chamber 48 and passage and port 54 in the valve 40 of device 6, and passage 52 into the quick service volume chamber 53, as above mentioned. As a result of such flow, a fast local reduction in pressure in the brake pipe on that particular car will be experienced which will hasten reduction in pressure in the brake pipe on the next car of the train, which reduced pressure in the brake pipe on the next car, if such car is equipped with the subject brake apparatus, will be sufficient to cause operation of the quick service valve device 6 on that car to effect a similar local reduction in brake pipe pressure thereon and so on serially back through the train from car to car.

However, at the same time, brake pipe fluid thus admitted to the respective quick service volume chamber 53 will escape to the atmosphere at a controlled rate by way of the groove 180 in valve 170 of the brake cylinder inshot valve device 8, as well as the passage 182, chamber 183 and restricted port 184 therein. Such flow of brake pipe fluid from the quick service volume chamber 53 to the atmosphere, affords a continued local venting of the brake pipe fluid on a respective car employing the brake equipment which assures that a reduction in brake pipe pressure will be realized in a plurality of succeeding cars, on which there may be no brake equipment, sufficient to cause operation of the quick service valve device 6 on the following cars so equipped.

It should be pointed out that since in Europe brake controlling valve devices do not have to distinguish between different service and emergency rates of reduction in brake pipe pressure, as they do in the United States, the quick service reduction in brake pipe pressure effective by operation of the quick service valve device 6 may be as rapid as desired, which, in conjunction with the very low differential in fluid pressure required to operate such quick service valve device, permits any desired rate of serial operation of the quick service valve devices in the various cars of a train.

When the pressure of fluid in the brake pipe 1 is reduced by operation of the quick service valve device 6, as just described, the corresponding reduction will occur in the brake pipe pressure chamber 115 in graduating control device 7, and when the pressure in said chamber thus becomes sufficiently reduced, the bottled up control reservoir pressure in the control reservoir pressure chamber 116 in said device 7 will move the diaphragm stack upwardly, as viewed in the drawing, against the reduced brake pipe pressure in chamber 115 and force of bias spring 100 in chamber 95.

It is intended that the diaphragms 112 and 90 move upwardly as just described when brake pipe pressure in chamber 115 is reduced, for example, two or three pounds below control reservoir pressure in chamber 116. However, if the diaphragm stack does not move upwardly upon such reduction in brake pipe pressure, then via the quick service valve device 6, pressure in the brake pipe 1 and chamber 115 will continue to be reduced, relative to control reservoir pressure in chamber 116, by way of the port and passage 121, and groove 120 in valve 102 in the graduating control device 7, passage 24, the chamber 48 and port and passage 54 in valve 40 of the quick service valve device 6, the passage 52, the quick service volume chamber 53, the passage 181, the groove 180 in valve 170 of the brake cylinder inshot valve device 8, and the groove 182, chamber 183, and restricted port 184 also in said device 8, until a sufficient differential between such opposing pressures on the diaphragm stack in the graduating control device 7 obtains to insure the desired movement. It will thus be evident that the positive local quick service venting of fluid under pressure from the brake pipe by operation of the quick service valve device 6 will insure movement of the respective diaphragm stack on the brake-equipped car even if located on a train to the rear of a bunch of two or more non-brake-equipped cars, or cars provided with brake equipment which is not operating.

Since the quick service valve device 6 merely functions to establish and disestablish communication between the brake pipe 1 and the quick service volume chamber 53, the slide valve 40 may be relatively small, so that said device 6 may be designed to dependably operate on a very slight reduction in brake pipe pressure, such as previously mentioned, to insure transmission of a sufficient quick service reduction in brake pipe pressure through a train as will cause prompt operation of all the quick service valve devices on the train serially, and to positively insure movement of each respective multiple-diaphragm graduating control device 7 out of its respective brake release position in which it is shown in the drawing, to an application position which will be presently described, even if said control device 7 is sluggish for any reason, in its response to reducing brake pipe pressure.

When the diaphragm stack of the control device 7 thus moves upwardly in response to a reduction in brake pipe pressure in chamber 115, upward movement of the valve 102 through the medium of pin 130 will cause corresponding upward movement of the release valve element 65 to first engage the release valve 64 to close off brake cylinder pressure chambers 62 and 95 from the atmosphere by way of the port and passage 80 in said seat element 65, and, thereafter, continued upward movement of said element 65 through the medium of the valve 64 will cause the supply valve 60 to move against opposition of the spring 67 and uncover the port end of the respective branch of the auxiliary reservoir passage 26 to allow for supply of fluid under pressure from the auxiliary reservoir 3 to the brake cylinder device 2 by way of the pipe 27, passage 26, annular chamber 72 encircling the reduced portion of valve 60, ports 73, chamber 62, passage 83, chambers 130 and 131 in the brake cylinder inshot valve device 8, passage 132 and pipe 85 without restriction, and via said chamber 130, passage 84, groove 302, passage 305, choke 308, chamber 320 and pipe 85 at a reduced rate. Such flow of fluid under pressure from the auxiliary reservoir 3 to the brake cylinder at a relatively rapid rate by way of both the passage 84 and the passage 132 insures that the slack in the brake rigging on the vehicle on any particular car will be taken up and the brake shoe advanced into engagement with the wheel in a minimum possible time.

When the pressure of fluid in the brake cylinder, as supplied thereto as above described, attains a value such as four pounds, for example, corresponding to attainment of the brake shoe into engagement with the wheel without any material application of force exerted by such shoe on the wheel, such brake cylinder pressure experienced within the brake cylinder inshot valve device 8 by exposure of the valve 143 within the area bounded by its seat 154 will overcome the opposition of the spring 175 acting on the diaphragm assemblage including diaphragm 140, and will cause, through abutting engagement of said valve 143 with said diaphragm assemblage, movement of the assemblage in the direction of chamber 150, thereby unseating said valve 143. Whereas, prior to unseating of the valve 143, only the force created by pressure of fluid acting thereon within the confines of the seat 154 is realized by the diaphragm assemblage to oppose action of the spring 175, upon unseating of the valve 143, the entire face of the diaphragm assemblage becomes exposed to the brake cylinder pressure as admitted to chamber 155 by way of the passage 156, stabilizing choke 157, header chamber 320 and the pipe 85. The assemblage will then move at a relatively rapid rate to its position opposite to that which it is shown in the drawing and defined by engagement of the follower member 141 of the diaphragm assemblage with an annular stop shoulder 176 formed in the casing. During such movement of the diaphragm assemblage to its lowermost position, as viewed in the drawing, the valve 170 will be advanced in the direction of chamber 183 to a position in which the groove 180 in said valve is out of communicative registry with the passages 181 and 34 to disestablish communication between the pressure chamber 19 in the charging control valve device 5 and the quick service volume pressure chamber 53 one with other and with atmosphere via passage 182, chamber 183 and port 184 in said device 8. At the same time, movement of the diaphragm 140 assemblage to its lowermost position also will allow the spring 138 to cause movement of the valve 136 in the direction of its seat 135 with downward movement of the valve stem 144 in following the movement of the diaphragm assemblage, until the valve 136 engages said seat and terminates communication between the chambers 130 and 131 in said device 8. Unrestricted communication between the auxiliary reservoir 3 and the brake cylinder device 2 by way of the chamber 131 and passage 132 is thus terminated. Subsequent to closure of the valve 136 in the brake cylinder inshot valve device 8, supply of fluid under pressure from the auxiliary reservoir 3 to the brake cylinder device 2 will occur exclusively by way of passage 83, chamber 130, passage 84, groove 302 in valve 300 in the service selector valve device 11, passage 305, and the choke 308, if said selector valve device 11 is in its freight position in which it is shown in the drawing, and the header chamber 320 and pipe 85. It will be appreciated that even during a relatively unrestricted supply of fluid under pressure to the brake cylinder device 2 by way of the brake cylinder inshot valve device 8 as above described to effect initial movement of the brake shoe into engagement with the wheel, the supply of fluid under pressure to the brake cylinder device will be aided and abetted by some flow of fluid under pressure by way of the service selector valve device 11 currently in discussion, to further aid in the assurance that such initial engagement of the brake shoe will transpire at a minimum time.

According to position of the operator's handle 330 in the service selector valve device 11, the rate at which fluid under pressure will be supplied to effect an increase in degree of brake application is determined according to the type of train employing the subject equipment as well as the mode of operation of such train. In "Freight"

position of the operator's handle 330, in which position it will occupy on a freight train, fluid under pressure is supplied to the brake cylinder 2 to apply the brakes by way of the choke 308 as aforedescribed, and such supply will be at a relatively slow rate, which rate will be sufficient to adequately decelerate a relatively slow moving freight train. On a passenger train, the operator's handle 330 will be moved to "Passenger" position to connect the input side of both chokes 308 and 314 to the brake cylinder supply passage 84 so that fluid under pressure supplied to the brake cylinder 2 from passage 84 will effect an increase in brake application at a more rapid rate than is attained in freight service where only the capacity choke 308 attains.

On any particular car, as fluid under pressure is supplied to the brake cylinder device 2 as just described, such pressure will also become effective in brake cylinder pressure chamber 95 in the graduating control device 7 to act, in assist with the brake pipe pressure in the chamber 115, in opposition to the control reservoir pressure in the chamber 116, on the diaphragm stack. Assuming that the reduction in brake pipe pressure effected by operation of the engineer's brake valve is limited to a chosen degree, then when the pressure obtained in the brake cylinder device 2 and as realized in chamber 95 in the graduating control device 7 is increased to a chosen value related to the degree of brake pipe reduction in chamber 115, such brake cylinder pressure acting in chamber 95, as assisted by the reduced brake pipe pressure in chamber 115, will move the diaphragm stack and the element 65 in the direction of said control reservoir pressure chamber 116 to allow the spring 67 to move the supply valve 60 to a lap position in which the auxiliary reservoir passage 26 is closed off from the chamber 62 in said device 7 and thereby to the brake cylinder device 2 to prevent further supply of fluid under pressure to said brake cylinder device and hence to said chamber 95.

In lap position of the supply valve 60, the release valve 64 will remain in seated engagement with the seat 79 to prevent communication between the brake cylinder device 2 and the atmosphere by way of the passage 80 in the release valve seat element 65. The balance of the diaphragm stack in the device 7 is thus re-established and further movement of said stack in the direction of the control reservoir pressure chamber 116 will terminate, so that with the valve 60 in its lap position the fluid at the desired pressure in the brake cylinder will be retained. Due to the differential in areas of the two diaphragm assemblages including diaphragms 90 and 112, respectively, a certain reduction in brake pipe pressure in chamber 115 requires two and one-half pounds of brake cylinder pressure to be established in chamber 95 to every pound of such brake pipe reduction below the control reservoir pressure existing in chamber 116 in order to cause the diaphragm stack to assume the position in which the supply valve 60 is in its lap position, as above described, to maintain pressurization of the brake cylinder device 2 at its desired value corresponding to such reduction in brake pipe pressure.

If the engineer on the locomotive desires to increase the degree of brake application, he will effect a further reduction in pressure in the brake pipe 1 throughout the train according to the increase in brake application desired. Upon the consequent reduction in pressure in the brake pipe 1 on a particular car, such reduction will be experienced in the brake pipe pressure chamber 95 in the respective graduating control device 7 to establish unbalance of pressure forces acting on its diaphragm stack in favor of preponderance in control reservoir pressure in chamber 116, which unbalance will result in movement of the stack in the direction of chamber 115, thereby carrying the slide valve 60 out of its lap position to its application position in which the supply passage 26 is again open to the brake cylinder supply chamber 62 to allow for admittance of fluid under pressure from the auxiliary reservoir 3 to the respective brake cylinder device 2, as previously described in detail. Again in response to pressurization of the brake cylinder pressure chamber 95 in the graduating control device 7 in degree according to degree of reduction in brake pipe pressure as experienced in chamber 115, the diaphragm stack of said device 7 will move in the direction of the control reservoir pressure chamber 116 to carry the slide valve 60 to its lap position as before to hold the particular desired pressure in the brake cylinder device 2. By reducing the brake pipe pressure in such increments as desired, proportional increases in pressure may be provided in the brake cylinder device 2 to create any selected degree of braking, or if desired, the brake pipe pressure may be reduced in a single continuous stage, which continuous reduction will result in a proportional continuous buildup in degree of brake application.

During operation of the graduating control device 7 to effect increase in the degree of brake application as above described, when, as a result of the supply valve 60 having been moved to its application position, the brake cylinder pressure attains the same value as that pressure existent in the auxiliary reservoir 3, subsequent over-reductions in brake pipe pressure in the chamber 115 will result in maintaining the diaphragm stack positioned to hold the supply valve 60 in its application position, but no further increase in brake cylinder pressure will be realized in chamber 95, so that the diaphragm stack will remain in application position for the duration of such overreduction in brake pipe pressure.

From the above description, it will be clear that an application of brakes may graduated on in any desired steps or may be made in a continuous step if desired. It will also be noted that closing of the valve 136 in the inshot valve device 8 during an application of the brakes will reduce the rate of supply of fluid under pressure to the respective brake cylinder device 2 according to the flow capacity of choke 308 or chokes 308 and 314 of the service selector valve device 11 as determined by the position of the service selector valve handle 330 according to the type of train in which the brake equipment is being employed, or by the type and manner of its operation in regard to vehicle speed. Valve 136 of the inshot valve device 8 closes at a pressure in the brake cylinder device 2 which is just sufficient to cause the brake cylinder piston to assume its application position, but not sufficient to produce effective braking, in order to prevent damaging run-in of slack in a train. Choke 308 or chokes 308 and 314 then brought into play govern the rate of effective brake application increase and will provide a sufficiently uniform rate of increase in degree of brake application according to the type and service of the train employing the equipment as will decelerate it and bring it to a stop without objectionable shock.

While the graduated control device 7 is in lap position, if there should be leakage of fluid under pressure from the respective brake cylinder device 2 so that the brake cylinder pressure is reduced below that called for by virtue of the brake pipe pressure existent in the brake pipe pressure chamber 95 in said device 7, such reduction in brake cylinder pressure as experienced in the brake cylinder pressure chamber 95 in device 7 will allow the pressure of fluid in the control reservoir pressure chamber 116 to move the diaphragm stack gradually upward to cause the supply valve 60 to sufficiently uncover the supply passage 26 as will permit auxiliary reservoir fluid to flow from passage 26 into chamber 62 and thence to the brake cylinder device by way of the choke 308 or/and choke 314 in the service selector valve device 11 as previously described to make up for such reduction in brake cylinder pressure and to maintain same in accord with the degree of reduction of brake pipe pressure. Subsequently, re-establishment of the proper brake cylinder pressure in chamber 95 in accord with the existent brake pipe pressure in chamber 115 will allow the former pressure to move the diaphragm stack and valve 60 back to lap position.

If during a brake application, leakage of fluid under pressure from the brake cylinder pipe occurs at a rate such that the pressure of fluid in the auxiliary reservoir 3 tends to become depleted as the result of automatic make-up in brake cylinder pressure by operation of the graduating control device 7 as above described, such depletion in auxiliary reservoir pressure will be made up or otherwise offset by supply of fluid under pressure from the brake pipe by way of the brake pipe pressure chamber 115 in the control device 7, the passage 118, the check valve 190 in device 9, chamber 108 and the auxiliary reservoir maintenance choke 193, the respective branch of the passage 26, and the pipe 27; the groove 105 in the valve 102 of the device 7 being out of registry with the passages 106 and 107 while the diaphragm stack is in its application position or its lap position. Such maintenance of the auxiliary reservoir pressure by way of the check valve 190 will avail the auxiliary reservoir pressure to within such as one and seven-tenths pounds of the brake pipe pressure existent in the chamber 115 in device 7, according to the value of the spring 191 in device 9. Such make-up of fluid under pressure to the auxiliary reservoir 3 from the brake pipe 1 during the existence of a moderate degree of brake cylinder leakage maintenance, will occur at any time that the auxiliary reservoir pressure as experienced at the output side of the check valve 190 in device 9 drops below one and seven-tenths pounds, for example, that brake pipe pressure existent in the brake pipe pressure chamber 115 in the device 7 at the input side of said check valve device. At that time, the preponderance in the pressure in passage 118 at the input side of the check valve 190 will be sufficient to overcome the action of the spring 191 on check valve 190 to allow for such auxiliary reservoir make-up from the brake pipe. The flow restricting action of the auxiliary reservoir maintenance choke 193 to the flow of brake pipe fluid during such make-up supply to the auxiliary reservoir 3 is such that should the brake cylinder leakage be extremely excessive and tend to deplete the auxiliary reservoir at too rapid a rate, such auxiliary reservoir make-up will be limited to a rate which will not over-reduce brake pipe pressure to the extent that subsequent release of the brakes by pressurization of the brake pipe would be placed in jeopardy.

Except in the case of depletion due to maintaining brake cylinder pressure against leakage, the pressure of fluid in the auxiliary reservoir 3 and thereby diaphragm chamber 46 in the quick service valve device 6 will always exceed that in the brake pipe pressure chamber 48 therein by a degree sufficient to hold the components of said device in their quick service position while the brake application is in effect. In case of depletion in auxiliary reservoir pressure down to that in the brake pipe 1, spring 47 in the quick service valve device 6 will, however, return the components of the quick service valve device 6 to their normal positions in which they are shown in the drawing and in which position the slide valve 40 laps off the quick service volume supply passage 52 from the brake pipe pressure chamber 48 in the said device 6; such act, however, will have no effect on the remaining portion of the equipment at such time.

If however, during a brake application and with the quick service valve device 6 in its quick service position in which the quick service volume supply passage 52 is connected to the brake pipe pressure chamber 48, the brake pipe 2 and hence chamber 48 in device 6 becomes vented to the atmosphere such as by brake-in-two of the hose couplings between the car or at the engineer's brake valve device, fluid under pressure in the quick service volume chamber 53 will become depressurized by equalization with the brake pipe to which said chamber is connected by way of device 6. Under such circumstances, however, the charging control valve device 5 will not be influenced by such action but rather will be maintained in its lap position by action of the brake cylinder pressure of fluid in the chamber 19 as communicated thereto by way of the passage 173 in valve 170 of the brake cylinder inshot valve device 8 in registry with the passage 34.

*Release of brake application*

To effect release of a brake application and to effect recharge of the equipment with fluid under pressure, fluid under pressure will be supplied to the brake pipe 1, thence via the passage 24 to the brake cylinder pressure chamber 115 in the graduating control device 7 via groove 120 and ports and passage 121 in the valve 102 of said device 7, which groove 120 will be in registry with the respective open end of the branch of passage 24 when the said device 7 is in its lap position or in its application position.

When the pressure of fluid in the chamber 115 in the control device 7 is thus increased sufficiently, it, acting in conjunction with the bias spring 100 in chamber 95, and with the brake cylinder pressure existent in said chamber 95, will create a sufficient force on the diaphragm stack in opposition to the force created by the control reservoir pressure acting in chamber 116 on said stack to move the diaphragm stack downwardly, as viewed in the drawing, to its release position in which it is shown in the drawing defined by engagement of follower member 111 with the spring biased stop element 126, and in which position the supply valve 60 is in a lap position, the release valve seat element 65 is disposed away from the release valve 64, and communicating registry is established between the groove 105 in valve 102 with the passages 106 and 107, while the groove 120 remains in registry with the brake pipe supply passage 24. In such release position of the diaphragm stack, communication is re-established between the vent passage 86 and the brake cylinder passage 83, by way of the passage 80 and release valve seat element 65, while the groove 105 re-establishes communication between the auxiliary reservoir recharge passages 106 and 107.

In each of the brake equipments, upon increase of pressure of brake pipe fluid in the brake pipe pressure chamber 115 in the respective graduating control device 7 to effect a release of brakes or a reduction in the degree of brake application, if such increase in pressure of brake pipe fluid results in preponderance of pressure in passage 118 at the input side of the check valve device 190 over the auxiliary reservoir pressure existent in chamber 108 at the output side of said check valve device to the extent of more than one and seven-tenths pounds, as hereinbefore described, such brake pipe pressure in passage 118 will be sufficient to cause unseating of the check valve 190 to allow for flow of brake pipe fluid from said passage 118 into passage 106, thence by way of the groove 105 in the valve 102 in said device 7, and the passage 107, groove 303 in the valve 300 in service selector valve device 11, and thence by way of the auxiliary reservoir recharge choke 309 or choke 309 and the choke 315, as well as the header chamber 321, passage 26, and pipe 27 to the auxiliary reservoir 3; which flow at this time is sufficient to recharge the auxiliary reservoir 3 to within one and seven-tenths pounds of brake pipe pressure at a relatively rapid but controlled rate. At the same time, brake pipe fluid reaching the output side of the check valve 190 will also flow at a relatively slow rate by way of the auxiliary reservoir maintenance choke 193 and said passage 26 to the auxiliary reservoir 3 in assist to that supplied thereto by way of the recharge choke 309 or choke 309 and choke 315. The combined capacity of recharge coke 309 or choke 309 and choke 315 in conjunction with the maintenance choke 193 is employed for relatively rapid rate of recharge of the auxiliary reservoir 3 upon the graduating control device 7 assuming its release position; the maintenance choke 193 being alone employed as previously described for the purpose of maintaining auxiliary reservoir 3 pressure while the brakes are applied if there is leakage of fluid under pressure from the brake cylinder device 2. The combined capacities of the choke 309 or choke 309 and choke 315 in conjunction with the maintenance choke 193 however, do provide for some restriction of such recharge flow of brake pipe fluid to the auxiliary reservoir 3 in release position of the respective graduating control device 7 to assure that such recharge flow will not too suddenly steal so much brake pipe fluid locally from the brake pipe on a particular car as would jeopardize the propagation of the increase in the brake pipe pressure back through the train and prevent realization on the succeeding brake-equipped cars of the fact that a release of the brakes is called for. Recharging of the auxiliary reservoir 3 by way of the choke 309 or choke 309 and choke 315 in conjunction with choke 193 will continue so long as the groove 105 in valve 102 of device 7 remains in registry with the passages 106 and 107 and the brake pipe pressure in the passage 118 exceeds the auxiliary reservoir pressure at the output side of the check valve 190 to the extent of one and seven-tenths pounds for example, sufficient to hold the check valve 190 unseated. When the auxiliary reservoir becomes pressurized to the extent of one and seven-tenths pounds less than the brake pipe pressure, the spring 191 in the check valve device 9 will seat the check valve 190 to prevent further supply of fluid under pressure to the auxiliary reservoir, at which time, further flow of fluid by way of the passage 118 to the auxiliary reservoir, as above described, will terminate.

At the same time, upon the respective graduating control device 7 assuming its release position in response to increase in brake pipe pressure in its chamber 115 as hereinbefore described, fluid under pressure from the brake cylinder device 2 will release at a controlled rate to the atmosphere by way of the pipe 85, choke 308 or choke 308 and choke 314 in the service selector valve device 11, according to position of the groove 302, the passage 84, chamber 130 in the brake cylinder inshot valve device 8, passage 83, chamber 62 in the graduating control device 7, passage 80 in the release valve seat element 65 of said device 7, passage 86, choke 310 or choke 310 and choke 316, according to position of the groove 304 in the selector service valve device 11, header chamber 322, and the port 87. The choke 308 alone in series with the choke 310 alone in the brake cylinder release communication above defined, provides a controlled rate of release of fluid under pressure from the brake cylinder device 2 such as will assure relatively even reduction in degree of brake release on a relatively slow moving freight train, while the combined capacities of both the chokes 308 and 314 in series with the combined capacities of the chokes 310 and 316 is employed in passenger service to allow for a more rapid reduction in degree of brake release commensurate with a higher speed of operation of passenger trains.

Such reduction in brake cylinder pressure as effected by release of fluid under pressure from the brake cylinder device 2 at a controlled rate by way of the graduating control device 7 in its release position and the service selector valve device 11 as above described, will result in a gradual reduction in brake cylinder pressure in proportion to restoration of brake pipe pressure, and such reduction will be realized in the brake cylinder pressure chamber 95 in said graduating control device 7. If the restoration of brake pipe pressure is limited to a degree lower than normal brake pipe pressure, such reduction in chamber 95 will result in a gradual unbalancing of the diaphragm stack of said device 7 in favor of preponderance of pressure of control reservoir fluid in chamber 116 which will cause movement of the diaphragm stack in the direction of chamber 62 to cause the release valve seat element 65 to engage the release valve 64 and close off the chamber 62 from the passage 80 in said element 65, thereby terminating further release of fluid under pressure from the brake cylinder device 2.

At the time that the respective graduating control device 7 responds to the reduction in brake cylinder pressure as experienced in its brake cylinder pressure chamber 95 and assumes its lap position, the brake cylinder pressure thereby established, due to the differential in areas between the diaphragms 90 and 112 as previously mentioned in regard to application of the brakes, will be proportional to the prevailing brake pipe pressure existing in the chamber 115 according to the ratio of two and one-half to one, i. e., every pound of increase in brake pipe pressure over that previously existing during a particular degree of brake application, will call for a two and one-half pound reduction in brake cylinder pressure to effect movement of the diaphragm stack back to its lap position.

It should be pointed out that on any particular car employing a subject brake equipment, should the rate of increase in brake pipe pressure tend to become excessive, such as on cars adjacent to the locomotive, such tendency will be realized by a corresponding tendency to over-pressurization of the brake pipe pressure chamber 115 in the respective control device 7. The diaphragm stack of said device 7 will respond to such tendency to move in the direction of the control reservoir pressure chamber 116 against opposition of the spring-biased stop element 126 thereby carried away from casing stop 127 and said stack will carry the respective slide valve 102, first to its release position in which it is shown in the drawing wherein the release valve seat element 65 is unseated from the release valve 64 to allow for release of fluid under pressure from the respective brake cylinder device 2 by way of the passage 80 in said element 65, and the uppermost end of groove 120 in the valve 102 is substantially coincident with the uppermost end of the port of passage 24; thereafter continued movement of the diaphragm stack in the direction of the control reservoir pressure chamber 116 will cause the uppermost end of the groove 120 in the valve 102 to partially or completely close the port end of the passage 24 to so restrict admittance of brake pipe fluid from said passage 24 into the chamber 115 as will establish a balance between the rate at which the pressure of fluid in the brake pipe pressure chamber 115 will increase relative to the resultant controlled rate of decrease in the brake cylinder pressure in chamber 95. Such control of rate of increase in pressure of fluid in the brake pipe pressure chamber 115 by automatic adjustment of position of the valve 102 as just described, in turn regulates the rate of admission of supply of fluid under pressure from said chamber 115 to the auxiliary reservoir 3 by way of the check valve device 9. On such cars adjacent to the locomotive, by virtue of such control in admittance of fluid to brake pipe pressure chamber 115, fluid will not be utilized from the brake pipe for recharging the auxiliary reservoir 3 at a rate which would unduly delay propagation of the brake pipe pressurization back through the train, thereby assuring that the succeeding control valve device 7 thereon will be promptly brought into operation to effect a release of the respective brakes on such cars as well as in effecting recharge of the respective auxiliary reservoir thereon.

Under the circumstances where, on any particular car, the pressure of fluid in the brake pipe 1 is increased to a value in excess of control reservoir pressure in the chamber 116, and such excessive brake pipe pressure persists for sufficient length of time to allow the brake cylinder pressure to be reduced to atmospheric pressure by way of the opening 80 in the release valve seat element 65, when the balance of the diaphragm stack, as determined by the degree of pressure in the chamber 115 and in the control reservoir pressure chamber 116, is restored, the stack will eventually assume a position in which the control valve 102 is so disposed relative to the casing that its groove 120 is out of registry with the port end of the brake pipe passage 24 to prevent over-pressurization of the brake pipe chamber 115 to any extent beyond seven-tenths of a pound above the control reservoir pressure existent in the chamber 116, as determined by the value of the spring 125. The diaphragm stack in the respective graduating control device 7 will remain in its position in opposition to action of spring 125, with the brake cylinder pressure reduced to atmospheric pressure and the auxiliary reservoir 3 charged to within one and seven-tenths pounds of the pressure existent in chamber 115 as determined by the spring value of the check valve device 9 so long as the excessive over-pressurization of the brake pipe on that particular car persists.

In the manner as described in the preceding paragraphs, the pressure of fluid in the brake cylinder device 2 may be graduated off in such steps as desired by proper step increases in pressure of fluid in the brake pipe 1, or increase in pressure in brake pipe 1 may be continuously uninterrupted. When the pressure in the brake pipe 1 and thereby in diaphragm chamber 115 finally becomes increased to within two or three pounds of the value of the normal pressure carried in the brake pipe, and which pressure is effective in the control reservoir 4 and acting in chamber 116 on diaphragm 112 of device 7, the balance thereby established on the diaphragm stack will hold said stack in its release position in which it is shown in the drawing as the pressure in the brake cylinder device 2 and chamber 95 is finally reduced to atmospheric pressure and the recharging of auxiliary reservoir 3 to within one and seven-tenths pounds of the pressure in the brake pipe will occur.

When the pressure of fluid in the brake cylinder device 2 becomes reduced to a substantially ineffective value, such as five pounds, the force of the spring 175 in the inshot valve device 8 will move the diaphragm assemblage out of contact with the shoulder 176 in the direction of chamber 151 to cause reseating of the valve 143 with its seat 154 while at the same time, unseating the valve 136 from its seat 135. Fluid under pressure bottled up in the quick service volume chamber 53 and in the pressure chamber 19 in the charging control valve device 5 will then release to the atmosphere by way of passages 181 and 34, respectively, groove 180 in valve 170 in the brake cylinder inshot valve device 8, passage 182, chamber 183, and restricted release port 184. This holding of fluid under pressure in the quick service volume chamber 53 until the opening of the valve 136 in the brake cylinder inshot valve device 8, which does not occur until the brake application is substantially fully released, prevents undesirable initiation of a quick service reduction in brake pipe pressure which would result in a shock producing application, if, while releasing, the operator should suddenly vent the brake pipe to effect a reapplication of the brakes and the quick service valve device 6 responded to assume its quick service position connecting the quick service volume chamber 53 to the brake pipe responsively to the reduction in brake pipe pressure intended to effect a reapplication of the brakes at that time. Under such circumstances, where reapplication would be called for, according to the present arrangement, the quick service volume chamber 53 being still charged with fluid under pressure prior to operation of the brake cylinder inshot valve device 8, as above described, quick service venting of fluid under pressure from the brake pipe will not therefore occur.

If while effecting release of the brakes, as above described, the brake pipe pressure chamber supply control valve 102 in the respective graduating control device 7 is positioned to close off the port end of the brake pipe passage 24 from the chamber 115, as it may be momentarily on cars adjacent to the locomotive in which the brake pipe is over-pressurized, and the engineer desires to increase the degree of brake application and reduces brake pipe pressure accordingly, such reduction in brake pipe pressure will not be realized in the chamber 115 of the respective graduating control device 7 until the decreasing brake cylinder pressure in chamber 95 experienced as a result of the unseated valve 64 allows the diaphragm stack to move upwardly, as viewed in the drawing. Thereupon, fluid under pressure from the brake pipe pressure chamber 115 will equalize into the brake pipe by way of the passage and ports 121 and groove 120 in valve 102, and the passage 24 to allow the pressure of fluid in the control reservoir pressure chamber 116 to move the diaphragm stack upwardly and seat the element 65 on release valve 64 to prevent further release of fluid under pressure from the brake cylinder. Thereafter, continued upward movement of the stack will cause movement of the valve 60 to its application position uncovering the auxiliary reservoir passage 26 to the chamber 62 to supply fluid under pressure to brake cylinder device 2 according to the degree of reduction in brake cylinder pressure experienced in chamber 115.

During release of the brakes, subsequent to the operation of the brake cylinder inshot valve device 8 to its uppermost position, as aforedescribed, in response to reduction in brake cylinder pressure to five pounds, when the brake cylinder pressure as realized in the chamber 19 in the charging control valve device 5 further reduces and obtains the value of such as three pounds, by dissipation by way of passage 34 in the brake cylinder inshot valve device 8, the spring 17 in said device 5 will effect movement of the valve 15 in said device to the right, as viewed in the drawing, to its charging position in engagement with the stop element 30 as defined by engagement of the diaphragm 16 with the stop element 30. In such position said valve 15 will re-establish registry between the chamber 28 and the brake pipe passage 23 as well as between said chamber 28 and the control reservoir supply passage 21 by way of the passage 29 in said valve. Upon such operation of the charging control valve device 5, pressure of fluid in the auxiliary reservoir 3 and the control reservoir 4 will equalize by way of the chamber 28 in said device 5, while full recharging of auxiliary and control reservoirs 3 and 4 to their normal value occur as the controlled rate by way of the initial-charge-limiting choke 204 and said chamber 28 as previously described in connection with initial charging.

As previously described in connection with initial charging, at the time that the charging control valve device 5 responds to return to its charging position as above described, should the control and auxiliary reservoirs 3 and 4 tend to become overcharged from the brake pipe by way of the limiting choke 204, upon re-establishing the brake pipe pressure normally carried in the brake pipe, such overcharge of these reservoirs will be rapidly dissipated by way of the combined capacity of the choke 204 and the choke 203 automatically brought into play by virtue of arrangement of the check valve 200.

As will be readily apparent from the previous description, if a car provided with this brake equipment is to be operated in passenger service, the service selector valve device 11 will be turned to its "Passenger" position in which the communication including choke 314 will be opened so that after operation of the inshot valve device 8 in response to a chosen pressure in the brake cylinder device 2 during application of the brakes, fluid under pressure will be supplied to the brake cylinder device at a controlled rate equal to the combined flow capacities of both the chokes 308 and 314 to provide the desired fast rate of increase of brake application for this service than permitted in freight service where choke 308 alone is effective.

Regardless of the position of the service selector valve device 11, the operation of the brake equipment otherwise in response to either a reduction or an increase in pressure of fluid in the brake pipe 1 is the same hereinbefore described.

*Summary*

It will now be seen that I have provided a brake apparatus of the graduated release type which restricts the rate of initial charging of such apparatus throughout a train to reduce the tendency for same to become overcharged, while assuring more even distribution of pressure of fluid in the brake pipe throughout the train during such initial charging in behalf of uniformity of charge from car to car. In addition, the subject brake apparatus provides for relatively rapid dissipation of any overcharge back into the brake pipe should such overcharge become existent in spite of the provisions to discourage its existence. In addition, improved means are provided the equipment for effecting a quick service reduction in brake pipe pressure locally on a respective car which assures realization of such reduction by the bake equipments on succeeding cars even though interceded by unbrake-equipped cars or cars on which the brake equipment or equipment may be cut out of operation.

Having now described the invention, what we claim as new and desire to secure by Letters Patent, is:

1. In a fluid pressure brake apparatus, in combination, a brake pipe, a brake cylinder device, a supply reservoir, a brake controlling valve device controlled by pressure of fluid in said brake pipe and an opposing pressure and operative upon a chosen reduction in brake pipe pressure relative to said opposing pressure to supply fluid under pressure from said supply reservoir to said brake cylinder device and upon an increase in brake pipe pressure to connect said brake cylinder device to atmosphere, an inshot valve device controlling a fluid pressure supply communication to said brake cylinder device and operative by a chosen brake cylinder pressure to close said communication and in response to a lesser brake cylinder pressure to open said communication, a constantly open relatively restricted communication in by-passing relation to said inshot valve device, a quick service valve device controlled by brake pipe pressure and an opposing pressure operative in response to less than said chosen reduction in brake pipe pressure to establish a communication for effecting a quick service reduction in pressure in said brake pipe, a control reservoir, charging valve means having a normal position in which said brake pipe is connected to said supply reservoir and to said control reservoir and operative in response to pressure of fluid in a chamber to a cut-off position in which said brake pipe is disconnected from the reservoirs, and valve means controlled by said inshot valve device for connecting the last named communication to said chamber when the pressure in said brake cylinder device is of said lesser degree and to close the last named communication when the pressure in said brake cylinder device is in excess of a chosen degree.

2. In a fluid pressure brake apparatus, in combination, a brake pipe, a brake cylinder device, a brake controlling valve device controlled by pressure of fluid in said brake pipe and an opposing pressure and operative upon a chosen reduction in brake pipe pressure relative to said opposing pressure to supply fluid under pressure to said brake cylinder device, an inshot valve device controlling a fluid pressure supply communication to said brake cylinder device and operative by a chosen brake cylinder pressure to close said communication and in response to a lesser brake cylinder pressure to open said communication, a constantly open relatively restricted communication in by-passing relation to said inshot valve device, a quick service valve device controlled by brake pipe pressure and an opposing pressure operative in response to a reduction less than said chosen reduction in brake pipe pressure to establish a quick service communication for effecting a quick service reduction in pressure in said brake pipe, a control reservoir, an auxiliary reservoir, charging valve means including a chamber constantly open to said auxiliary reservoir and having one position in which said brake pipe is connected through a port to said chamber and said chamber is connected through a second port to said control reservoir and operative in response to pressure of fluid in a control chamber to another position in which said ports are closed, and valve means controlled by said inshot valve device for connecting said quick service communication to said control chamber when the pressure in said brake cylinder device is of said lesser degree and to close said quick service communication when the pressure in said brake cylinder device is in excess of a chosen degree.

3. In a fluid pressure brake apparatus, in combination, a brake pipe, a brake cylinder device, an auxiliary reservoir, a control reservoir, a brake controlling valve device responsive to a chosen reduction in brake pipe pressure relative to control reservoir pressure to supply fluid under pressure from said auxiliary reservoir to said brake cylinder device, a charging valve device having a control chamber and normally connecting the auxiliary and control reservoirs to said brake pipe and operative responsively to pressurization of said control chamber to close the auxiliary and control reservoirs to said brake pipe, a quick service communication normally open with restriction to the atmosphere and without restriction to said control chamber, a quick service valve device operative responsively to a reduction in brake pipe pressure less than said chosen reduction to connect said brake pipe to said quick service communication, and valve means operable to a certain position for closing said control chamber to said quick service communication and connecting said control chamber to a source of fluid under pressure independent of said quick service communication.

4. The combination as set forth in claim 3, further characterized in that said brake cylinder device constitutes said source of fluid under pressure for pressurization of said control chamber independently of said quick service communication.

5. The combination as set forth in claim 4, including means responsive to brake cylinder pressure to actuate said valve means to said certain position upon increase in brake cylinder pressure above a certain value.

References Cited in the file of this patent
UNITED STATES PATENTS
2,661,248   Keller _____ Dec. 1, 1953